United States Patent [19]
Weitzel et al.

[11] 3,933,679
[45] Jan. 20, 1976

[54] UNIFORM MICROSPHEROIDAL PARTICLE GENERATING METHOD

[75] Inventors: William H. Weitzel; Lee D. La Grange, both of San Diego, Calif.

[73] Assignee: Gulf Oil Corporation, San Diego, Calif.

[22] Filed: May 8, 1973

[21] Appl. No.: 358,410

Related U.S. Application Data

[63] Continuation-in-part of Ser. No. 217,853, Jan. 14, 1972, Pat. No. 3,731,851.

[52] U.S. Cl. .................. 252/301.1 S; 264/.5; 264/9
[51] Int. Cl. ............................................ C09k 3/00
[58] Field of Search .............. 264/.5, 9; 252/301.1 S

[56] References Cited
UNITED STATES PATENTS

| | | | |
|---|---|---|---|
| 3,290,122 | 12/1966 | Clinton et al. | 252/301.1 S |
| 3,329,745 | 7/1967 | La Grange et al. | 252/301.1 S |
| 3,340,567 | 9/1967 | Flack et al. | 252/301.1 S |
| 3,345,437 | 10/1967 | Flack et al. | 252/301.1 S |
| 3,463,842 | 8/1969 | Flack et al. | 252/301.1 S |
| 3,617,584 | 11/1971 | Flack et al. | 252/301.1 S X |

Primary Examiner—Benjamin R. Padgett
Assistant Examiner—R. E. Schafer
Attorney, Agent, or Firm—Fitch, Even, Tabin & Luedeka

[57] ABSTRACT

A method for preparing uniform, spherical microspheres from an aqueous liquid sol feed stock, particularly of a fertile and/or fissionable nuclear fuel material. In the method, a jetstream of the liquid feed stock is provided, uniformly periodic varicose instabilities are induced in the jetstream, a concurrent, coaxial stripping flow of inert fluid is provided surrounding the jetstream to enhance the varicose instabilities in order to cause the uniform dispersion of the jetstream into uniform spherical droplets, and the uniform droplets are subsequently solidified.

The present invention is directed to methods for manufacturing uniform microspheres of inorganic materials, and more particularly, is directed to such methods for generating large numbers of small microspheres by sol-gel processes and to methods which are particularly suitable in the preparation of uniform solid microspheres of fertile or fissionable nuclear fuel materials.

5 Claims, 7 Drawing Figures

UNIFORM MICROSPHEROIDAL PARTICLE GENERATING METHOD

The present application is a continuation in part of our copending application Ser. No. 217,853, filed Jan. 14, 1972 now U.S. Pat. No. 3,731,850, and entitled Droplet Generator and Method.

The provision of microspherical particles is important in various technical and industrial applications such as in the preparation of nuclear fuel for high-temperature, gas-cooled reactors and in the preparation of particulate catalyst materials used in petroleum refining and other chemical processes. It is desirable, and sometimes essential, that such microspheres be provided which are of a preselected uniform size, and which are of uniform, regular shape.

Microspherical particles are conventionally manufactured by dispersing a suitable liquid feed stock, containing dissolved or suspended material, into small droplets and subsequently solidifying the droplets in a suitable manner, such as by chemically gelling the droplets and/or evaporating or otherwise removing the solvent or liquid carrier from the droplets.

For example, oxide microspheres such as particulate nuclear fuel particles have commonly been made by the so-called "sol-gel" processes, wherein a fertile and/or fissionable material is prepared in the form of an aqueous sol liquid feed stock which is dispersed into small droplets which are subsequently dehydrated or otherwise treated under controlled conditions to produce form-stabilized gel particles. The form-stable particles are then sintered to a high density and may be subsequently coated with a refractory material such as pyrolytic carbon. Processing of these droplets to final spherical oxide particles is most efficiently carried out if the droplets are uniform in size and regular in shape. The provision of spherical oxide particles having a very narrow size distribution is particularly important in the satisfactory manufacture of certain types of nuclear reactor fuel materials.

The overall production rate of oxide microsphere particles is generally limited by the rate at which the liquid feed stock may be dispersed into droplets. Economical production of microspheres such as oxide nuclear reactor fuel particles generally requires high rates of conversion of liquid into suitably sized droplets.

The quality and uniformity of dispersion of liquid sol feed stock into droplets is a generally limiting factor with respect to the quality and uniformity of the finished oxide particles. Accordingly, it is desirable in the manufacture of uniform solid microspheres that the dispersion of liquid sol feed stock be carried out at a relatively high rate without sacrifice of droplet uniformity or quality. However, obtaining high throughput rates from droplet generating devices generally has been associated with a wide range of droplet size, shape or quality. For example, droplet generators such as spray nozzles and spinning discs and bowls provide feed stock dispersion at a high throughput capacity, but produce an undesirably wide droplet size distribution.

Conversely, generally uniform droplets of liquid sol may be generated by relatively low capacity, monodispersive droplet generating devices which form and release individual droplets at a suitable orifice such as a capillary, either under the force of gravity or with the carefully adjusted coaxial flow of a second fluid. The second fluid is conventionally reactive with the liquid sol droplets through solvent extraction of pH change to result in solidification of the droplets through gellation, and the form-stabilized particles thus provided are generally subsequently sintered. The production rate from such devices varies from less than a hundred droplets per minute for gravity induced droplet formation to about 2,000 droplets per minute for a well adjusted two-fluid nozzle. Increased droplet generation rates of about 20,000 droplets per minute with relatively good size uniformity may be achieved with vibrating capillary devices in which reciprocating motion at a preselected droplet generation frequency is imparted to the capillary or feed stock incident to dispersion of the liquid feed stock and of sufficient magnitude to result in the more or less uniform formation of droplets therefrom. It is also known to introduce a stream or jet of liquid sol feed stock into a quiescent zone of extraction solvent, in conjunction with a vibrator in the feed supply system.

Vibrating capillary devices for producing single streams of relatively uniform liquid drops have been developed for a variety of purposes distinctly differing from the sol-gel production of solid particulate microspheres, and generally all such vibrating capillary devices are based, at least in part on the theoretical analysis of Lord Rayleigh and subsequent workers on the instability of capillary jets.

In this connection, it is also known that for jet-streams of relatively simple inviscid fluids which readily break up under the influence of feedstock vibration without a coaxial gas flow into generally uniform droplets, that the problem of drop coalescence caused by the differential speed of drops following in the wake of their predecessors can be minimized though the provision of a generally gentle flow around the liquid jets through holes concentric with the capillaries adequate to prevent the drops from following in the trajectory of their predecessors.

However, there is a need for improved processes for manufacturing solid particulate microspheres involving the uniform dispersion of more complex, non-newtonian fluid sols as well as the additional complexities of surface-interactive gellation pheonomenon.

Accordingly, it is an object of the present invention to provide an improved method for manufacturing solid microspheres by a sol-gel process. It is a further object to provide a method which is capable of providing high production rates of uniformly sized solid, microspheres. It is a further object to provide microspherical particle manufacturing method which is reliable and flexible in operation over a wide range of parameters such as selection of particle size and production rate. It is still another object to provide an improved sol-gel method for continuously generating large numbers of small, uniform solid particles having a narrow particle size distribution, which process is economical and easy to control, and which is particularly adapted to the production of nuclear fuel particles.

These and other objects of the invention are more particularly set forth in the following detailed description and in the accompanying drawings of which.

The present invention is directed to improvements in the sol-gel processes for the manufacture of solid microspheres of inorganic oxides, carbides or nitrides, and particularly nuclear fuel particles, in which a liquid sol for the inorganic material is dispersed into droplets, the droplets are solidified to a form-stable condition by contact with a gelling fluid, and the gelled, solidified droplets are subsequently sintered. Generally, the improvements with respect to such sol-gel processes comprise, in combination, carrying out the steps of providing a jetstream of a liquid sol feed stock having a viscosity of about 10 or more centistokes, inducing uniformly periodic varicose instabilities in the jetstream having a wavelength of at least about $\pi$ times the unperturbed diameter of the jetstream, providing a concurrent, coaxial stripping flow of a first fluid surrounding the jetstream to enhance the varicose instabilities in order to cause the uniform dispersion of the jetstream into uniform spherical droplets, said first fluid being substantially inert with respect to causing the solidification of the sol, and subsequently contacting said droplets with a second fluid which is interactive with the sol to solidify the droplets. The inert stripping fluid should be compatible with the second, solidification or "gellation" fluid.

As indicated, the improved method of the invention is particularly adapted for preparing spherical particles of fertile and/or fissionable nuclear fuel materials having a high degree of particle size uniformity consistent with high production rates. Particular materials suitable for preparing sols for use in the improved method include the actinide metals. The soluble salts such as nitrates, oxylates, chlorides, phosphates, etc. and oxides, mixtures of these oxides, solid solution systems of actinide metal oxides or other ceramic oxides may be used in the preparation of the sols in accordance with conventional practice. The actinide metals include the elements in the actinide series in the periodic table, thorium, uranium, plutonium, etc. The method of the invention is, however, also suitable for preparing spherical particles from various other colloidal or gellable materials which are capable of forming sols. For example, the colloids of alumina, zirconia, beryllia, silica, magnesia, chromia, the refractory oxides of metals in Group IV of the period table transition element oxides, rare earth oxides and their mixtures may be prepared into sols. The sols used in the present method may be prepared by any known process and generally will have a viscosity of from about 10 centistokes to about 60 centistokes, and generally the actinide sols will have from about 100 to about 1300 grams of the heavy metal per liter. It should be noted that the term sol is used broadly herein to include the gellable solutions of soluble salts of these materials conventionally employed in sol-gel processes. Suitable sols and the process for making such sols for use in sol-gel processes are well known in the art.

In accordance with the present method, a jetstream of the liquid sol feed stock is provided, and uniformly periodic, varicose instabilities are generated in the jetstream, which instabilities are alternate dilations and contractions in the jet which are generally radially symmetrical with respect to the jet axis. The instabilities will generally have a wavelength of at least $\pi$ times the unperturbed diameter of the jetstream and may have a frequency of more than 100,000 cycles per minute. Also in accordance with the present method, flow of stripping fluid surrounding the jetstream is provided to enhance these instabilities in order to cause the uniform breakup of the jet into uniform spherical droplets.

As will be more fully described hereinafter, this stripping fluid is substantially inert with respect to the sol of the jetstream, and in various embodiments may be either a gas or a liquid.

Illustrated in FIGS. 1 to 5 is a monodispersive droplet generating device 10 which is suitable for carrying out an embodiment of the present invention employing a gas as the stripping agent. The droplet generator 10, illustrated in cross-section in FIG. 2, includes means 12 for providing a jetstream of the liquid feed stock to be dispersed into droplets, and means 14 for generating uniformly periodic varicose instabilities in the jetstream. The droplet generator 10 also includes means 16 for providing a concurrent coaxial flow of inert gas 24 surrounding the jetstream to enhance varicose instabilities 22 in the jetstream 20 in order to cause the uniform dispersion of the jetstream into uniform spherical droplets 26 of the liquid feed stock.

Figures 1, 2, 3, 4:
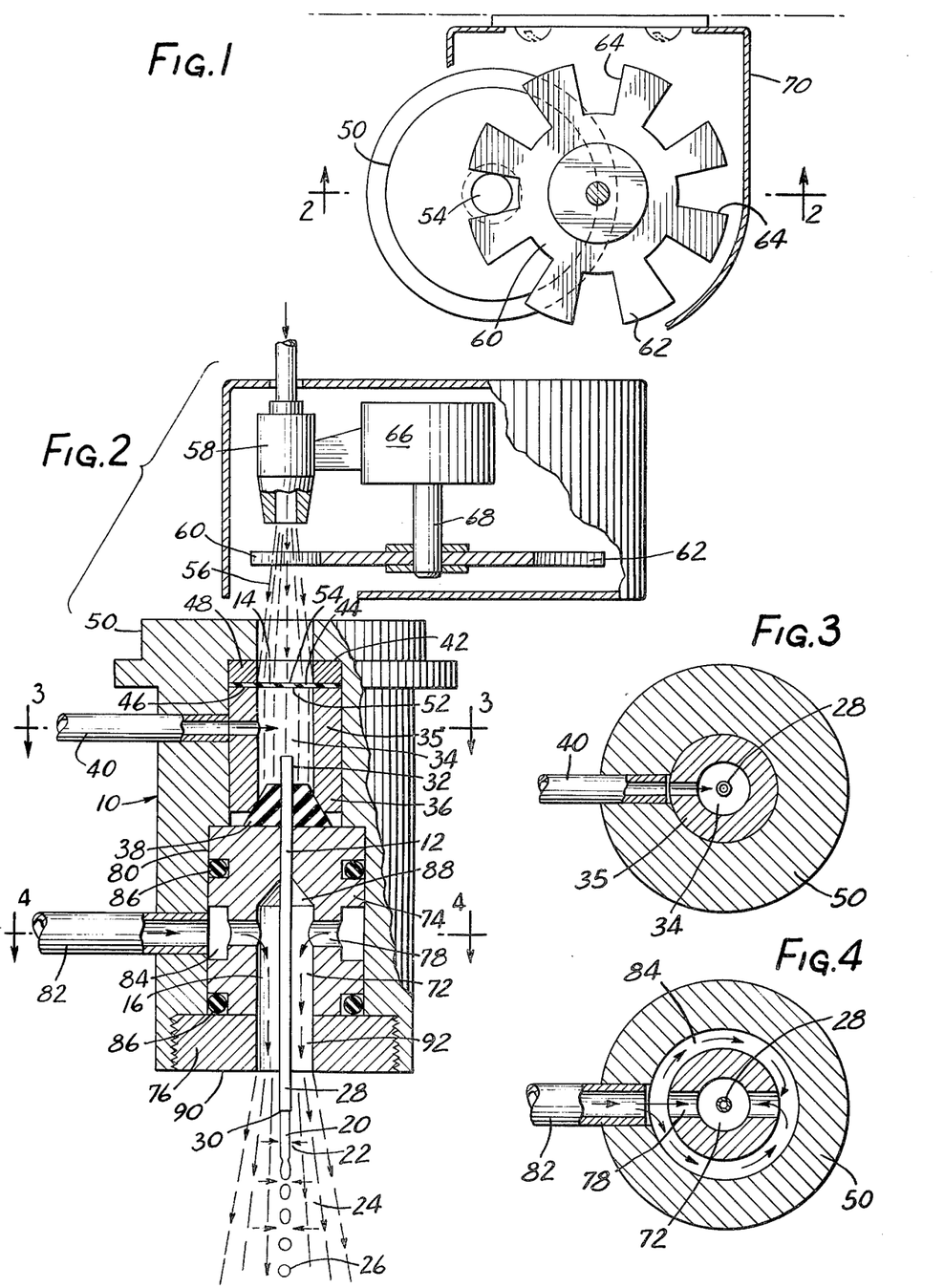
FIG. 1 is a top view, partially broken away of an embodiment of a droplet generating device suitable for carrying out a method in accordance with the present invention in which a gaseous coaxial stripping fluid is employed.
FIG. 2 is a cross-sectional side view of the droplet generating device of FIG. 1 taken through line 2—2.
FIG. 3 is a cross-sectional view of the droplet generating device of FIG. 2 taken through line 3—3.
FIG. 4 is a cross-sectional view of the droplet generating device of FIG. 2 taken through line 4—4.
Figure 5:
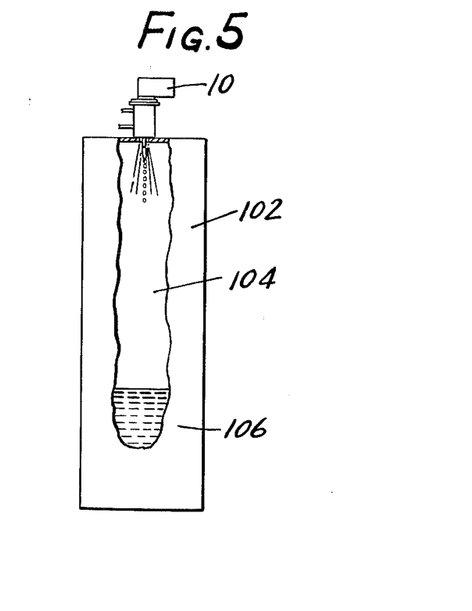
FIG. 5 is a side view, partially broken away, of additonal apparatus for use in connection with the droplet generating device of FIGS. 1–4 in carrying out an embodiment of the method of the present invention.

In the illustrated device for carrying out a gaseous stripping embodiment of the method, the means 12 for providing the jetstream 20 comprises a tube 28 through which the liquid feed stock may be forced to provide the jetstream. The tube 28 in the device 10 may be a straight capillary cylinder having a constant uniform interior and exterior diameters throughout its length. Preferably, however, a reduction in pressure to force the jet stream through tube 28 and a marked increase in droplet production rate can be obtained by employing a tube having an internal diameter considerably larger than the desired capillary orifice diameter together with interchangeable inserts located at the distal end 30 to provide a multiplicity of selective and readily changeable orifice diameters. The distal end 30 of the capillary tube accordingly provides a suitable orifice from which the liquid feed stock may issue as a well defined jetstream 20 upon being forced through the capillary tube 28. The proximal end 32 of the capillary tube 28 is in fluid communication with a liquid feed stock reservoir chamber 34. The feed stock chamber 34 generally has a cylindrical shape defined by a cylindrical housing 35 which in the illustrated embodiment is constructed from a suitable material inert to the liquid sol feed stock, such as stainless steel. The cylindrical housing 35 is connected at one end 36 in a fluid tight manner with the capillary tube 28 by means of a resilient gasket 38 having the form of a truncated cone. As also illustrated in FIGS. 2 and 3, the capillary tube 28 penetrates the gasket 38 along its longitudinal axis, and the gasket and capillary tube are centered at the end 36 of the cylindrical housing 35 so that the capillary tube also lies along the longitudinal axis of the cylindrical liquid feed stock chamber 34. The resilient gasket 38 is held in compression against the end 36 of the cylindrical housing 35 to thereby provide a fluid tight seal both between the gasket and the housing, and between the gasket and the capillary tube 28.

The liquid feed stock chamber 34 is supplied with the liquid sol feed stock via supply tube 40 through the side of the cylindrical housing 35. The supply tube 40 makes fluid tight communication with the reservoir chamber 34, and is in fluid communication with a source (not shown) of a suitable liquid feed stock. The liquid feed stock may be fed at a preselected uniform rate through the supply tube 40 into the chamber 34, and will then be forced through the capillary 28 to provide a jetstream 20 as it emerges from the orifice at the distal end 30 of the capillary. As will be described hereinafter, the feed rate into the chamber and through the capillary to provide the jetstream is directly related to the droplet production rate, and is capable of providing relatively high throughput rates consistent with excellent particle size uniformity.

In addition to serving as part of the fluid supply system to the capillary tube 28 from which the jetstream 20 exits the system, the reservoir chamber 34 also functions in the generation of uniform, periodic varicose instabilities in the jetstream in accordance with the present method. It should be noted that this instability generation in the jetstream is accomplished through the transmission of pressure pulses to the capillary supply stream rather than through the direct vibration of the capillary. In this connection, the pressure pulses are transmitted directly to the liquid sol feed stock in a reservoir chamber 34 having a diameter substantially greater than the capillary from which the jetstream issues. As will be more fully described hereinafter the transmission of pulsatile energy to the feed stock in the reservoir 34 in the generation of the instabilities is insufficient by itself to provide highly uniform drops and gelled particles of the liquid sol feed stock.

The reservoir chamber 34 is sealed by means of a resilient membrane 44 at its end 42 which is opposite the end 36 of housing 35 adjacent the proximal end 32 of the capillary tube. The membrane 44 is constructed of a suitable flexible material such as polyethylene which is impervious to the liquid feed stock. In the illustrated embodiment, the resilient membrane is in the form of a thin circular disc having a diameter greater than the diameter of the cylindrical reservoir chamber 34. The flat resilient membrane is mounted so that it abuts the planar end 46 of the cylindrical housing 35 and is held in compressive relationship against the planar face 46 of the cylindrical housing by retainer ring 48. The retainer ring in turn abuts the outer body 50 of the droplet generator 10 along a direction longitudinal of the axis of the capillary tube 28 and the cylindridal reservoir chamber 34.

As is shown in FIG. 2, the interior surface 52 of membrane 44 forms one surface of the liquid feed stock reservoir chamber 34, while the exterior surface 54 of the membrane is exposed through a cylindrical cavity which is formed by the retainer ring 48 and the outer body 50 of the generator 10 and which is coaxial with the reservoir compartment 34. Because the membrane 44 is relatively flexible, it is capable of transmitting pressure pulses from its exterior surface 54 to the liquid feed stock contained in the reservoir compartment, and it will be seen that any pressure pulses so transmitted will be delivered to the jetstream of liquid feed stock as it issues from the orifice of the capillary tube 28 at its distal end 30. Such pressure pulses in turn will generate varicose instabilities in the jetstream 20. In the illustrated embodiment, the pressure pulses are produced by periodic impingement of a gas stream, such as an air jet, upon the exterior surface 54 of the membrane 44. Uniform periodicity is induced in the impinging gas stream by means of a shutter interposed between the membrane and the source of the gas stream. Uniform periodicity of the impinging gas stream, and consequently uniform periodicity of the pressure pulses transmitted to the fluid issuing from the capillary orifice will result in uniform periodicity in the varicose instabilities generated in the jetstream 20. In the illustrated embodiment, a continuous jet 56 of air or other gas is supplied by a nozzle 58. The nozzle 58 is in communication with a pressurized gas source (not shown) which may be regulated in a suitable manner to provide a desired, uniform flow rate through the nozzle. The nozzle is positioned coaxially with respect to the axes of the capillary tube 28 and the reservoir chamber 34, and the gas jet 56 is accordingly directed to provide orthagonal impingement upon the flexible membrane 44. In order to convert the steady gas jet 56 from the nozzle into a rapid and regularly periodic source of pressure pulses, a rotary shutter arrangement 60 is interposed between the nozzle 58 and the membrane 44. As best shown in FIG. 1, the rotary shutter 60 comprises a flat circular disc 62 which is rotatably mounted with an axis of rotation generally parallel to, but displaced laterally from, the axes of the nozzle 58, reservoir chamber 34 and capillary tube 28. The disc 62 has a plurality of generally rectangular notches 64 provided at regular intervals about its circumference, and as shown in FIGS. 1 and 2, the lateral displacement of the rotational axis of the notched disc 62 a distance somewhat less than the radius of the disc, provides for regularly periodic obstruction of the flow of gas from the nozzle 58 to the membrane 44 upon rotation of the notched disc at a uniform angular velocity. In this connection, the disc 62 is connected to a suitable motor 66 via mounting shaft 68 in order to provide for rotation of the disc at a desired, uniform velocity. The speed of motor 66 may be selected or regulated in any suitable manner. By appropriate choice of the number of notches 64 and the rotational speed of the disc, a very wide range of pulse frequencies may be provided. In addition, the total energy delivered to the membrane during each pulse may be varied by varying the delivery pressure of the gas jet 56 through the nozzle 58 and/or the width of the notches 64 in the disc 62. This capability of regulation of the gas-jet pulse frequency and strength provides for adjustment of the frequency and amplitude of the varicose instabilities generated in the liquid jet stream 20 for operation of the droplet generator. The nozzle 58 and notched disc 62 are enclosed within a housing 70 in order to contain the nose generated by the operation of the gas-jet, rotational shutter system.

Uniformly periodic varicose instabilities may also be provided in the liquid sol jetstream by other means of transmitting pressure pulses to the liquid sol feed stock in the reservoir which communicates with the capillary 28. In this connection, electrodynamic shaker coils suitably coupled with the fluid in the reservoir may also be employed, as will be described more fully hereinafter in connection with another embodiment of the present method employing a liquid as the stripping fluid.

The droplet generator 10 also includes means 16 for providing a concurrent, coaxial flow of gas surrounding the jetstream 20 in order to enhance the varicose instabilities generated in the jetstream so as to cause the uniform dispersion of the liquid jetstream 20 into uniform spherical droplets. The provision of this inert coaxial stripping gas stream is believed to have an important effect, in synergistic combination with the provision of the varicose instabilities, in inducing the uniform break up of the jetstream of the liquid sol type fluid, as well as functioning in the desired control of the solidification (gellation) of the uniformly sized droplets produced thereby.

The capillary tube 28 extends from the liquid feed stock reservoir chamber 34 through a cylindrical passageway 72 which is formed by the coaxial gas flow director 74 and packing nut 76. The cylindrical passageway 72 is coaxial with the capillary tube 28 and is in communication with a plurality of feed passageways 78 which penetrate through the coaxial flow director for supplying inert gas for the coaxial air flow.

As shown in FIGS. 2 and 4, the coaxial flow director 74 is generally cylindrical in shape and resides in a cylindrical recess 80 in the droplet generator body 50. A gas supply line 82 extends through the body 50 in communication with a manifold 84, recessed about the circumference of the coaxial flow director 74, which serves to distribute gas to the gas feed passageways 78. 0 ring seals 86 seal the gas supply system of the coaxial flow director.

The cylindrical passageway 72 should be of sufficient length to provide for a radially uniform flow of gas generally in a direction concurrent with the direction of flow of the liquid jetstream 20. The provision of plural gas feed passageways 78 into the cylindrical passageway 72 of the coaxial flow director 74 also aids in the establishment of a uniform flow of gas around the jetstream 20. The interior end 88 of the cylindrical passageway 72 is sealed, with the coaxial flow director 74 providing support for the capillary tube 28 at this point. The exterior end 92 of the cylindrical passageway is, of course, open and terminates at the exterior face 90 of the packing nut 76. The capillary tube 28 extends slightly beyond the exterior end 92 of the cylindrical passageway 72 so that the coaxial flow of gas from the passageway will be unconfined about the liquid jetstream 20 as it exits the capillary orifice. The packing nut 76 in the illustrated device 10 not only serves to define the terminal portion of the cylindrical passageway, but also functions to complete the assembly of various components of the droplet generator. The packing nut 76 maintains the coaxial flow director in compression against the gasket 38 which in turn is compressed and sealed against the cylindrical housing 35. The cylindrical housing 35 is similarly sealed against the membrane 44 and the retainer ring 48, which is seated against a flange in the outer body 50 of the generator 10.

The droplet generator 10 is disposed such that the liquid sol jetstream and coaxial flow of inert gas are directed into a zone containing a fluid which is suitable for solidification of the liquid feed stock sol material. As illustrated in FIG. 5, the droplet generator 10 may be positioned atop a vessel 102 containing a fluid capable of gelling the sol material to a solid, form-stable state. In the illustrated embodiment, the gelling fluid has a gaseous zone 104 and a liquid zone 106. The gaseous zone contains a vapor which is reactive with the liquid sol material to result in solidification thereof and in the illustrated embodiment for acidic sols which gel upon basic pH change, is ammonia vapor, although other volatile bases could be employed. The sol droplets formed by the generator 10 are directed through the gaseous zone 104 and in passing through the zone 104 achieve sufficient solidification or form stabilization in the zone 104 to withstand impact with the liquid gellation phase 106, which in the illustrated embodiment is an aqueous solution of ammonia, although solutions of other bases may also be employed. The gellation of the droplets is completed in the liquid phase zone 106. The residence time of the droplets in the ammonia zone to provide the desired degree of form stability depends upon a number of factors such as the rate of reaction of the liquid sol droplets with the ammonia gas, and travel distances of from about ½ meter to 4 meters have been found to be satisfactory.

In operating the droplet generator 10, the liquid sol feed stock is fed by a suitable mechanism at a uniform, preset flow rate through the liquid feed stock supply tube 40 into the liquid feed stock reservoir 34. Generally, this flow rate will be adjusted so that, in the absence of varicose instability generation and coaxial gas flow, a relatively smooth, laminar jetstream 20 will be delivered from the capillary tube extending a readily observable and appropriate distance beyond its orifice such as between about 1 and about 4 centimeters for capillary tubes having an inside diameter in the range of from about 400 $\mu$ to about 1200 $\mu$.

Regular, varicose instabilities are generated in the liquid jetstream 20 through the transmission of correspondingly regular pressure pulses to the liquid sol feed stock in a reservoir zone feeding capillary tube from which the jetstream issues. In this regard it is desirable that the varicose instabilities in the jetstream have a frequency such that the ratio of the instability wavelength to the unperturbed jetstream diameter be greater than about $\pi$ and preferably should be between about 4 and about 8. A ratio of about 4.5 is particularly desirable. By instability wavelength is meant the distance along the liquid jetstream between successive radial maxima or minima of the regularly periodic instability generated in the jetstream. For practical purposes, the unperturbed diameter of the jetstream may be referenced to the diameter of the jetstream may be referenced to the diameter of the capillary tube orifice. For the embodiments of the present method which employ a gaseous stripping fluid, the provision of the varicose instabilities is generally insufficient by itself to result in the desired uniform break up of the liquid sol materials, and the specified inert gas stripping stream is required to achieve the desired results.

A desired instability wavelength to unperturbed jetstream diameter may be established in any suitable manner. When the flow into the liquid chamber 34 has been adjusted to provide a smooth laminar jetstream, this flow rate may be measured and the jetstream velocity calculated from this value and the diameter of the capillary orifice. The rotational speed of the notched disc 62 may then be adjusted to provide the proper frequency of pressure pulse impingement from the gas nozzle 58 on the membrane 44 to result in the generation of regularly periodic varicose instabilities of the desired wavelength in the jetstream. As indicated, the generation of varicose instabilities in the liquid sol jetstream through the provision of periodic pressure pulses is not sufficient to induce droplet formation of the desired uniformity or rate. A coaxial flow 24 of a gas such as air which is relatively inert to the liquid properties of the liquid sol feed stock is provided by means 16 in order to enhance the instabilities to the point of uniform droplet formation. With the liquid flow rate and the instability frequency set but no coaxial gas flowing, the droplet production rate and size distribution will be relatively random. As the coaxial gas flow is begun and increased, an increasing fraction of uniform droplets are produced having an ideal volume equal to the volumetric flow rate of the liquid feed stock in the jetstream, divided by the instability frequency. At low coaxial gas flow rates there will be a significant fraction of droplets having volumes which are an integral multiple of the ideal droplet volume. As the coaxial gas flow rate is increased, the fraction of ideal size droplets will increase until essentially all of the droplets are uniform and ideal in volume. If coaxial gas flow is further increased, smaller droplets tend to appear and finally the liquid jetstream becomes an entrained spray consisting of a random distribution of very small droplets.

With reference to the embodiment of FIG. 2, it will be seen that the liquid jetstream from the capillary tube 28 extends somewhat, for example about 0.5 centimeter, beyond the coaxial gas flow orifice. Because of this geometry, in the illustrated embodiment, the numerical velocity along the jetstream, which generally will exceed the velocity of the liquid jetstream, cannot be readily calculated, but rather may be controlled on a volumetric flow basis and may be readily adjusted to achieve the desired uniformity of breakup of the liquid jetstream. However, in general it can be stated that the stripping gas flow rate preferably will be in a range of from about 1 to about 8 times and more preferably from about 1 to about 5 times the velocity of the liquid sol jetstream along the jetstream at the point it issues from the capillary which forms it. Jetstream velocities of from about ½ to about 2 meters per second have been found to be satisfactory. It should also be pointed out that a coaxial gas flow without the generation of regular, periodic varicose instabilities therein will not produce a uniform dispersion of droplets at a high production rate.

In general, when the coaxial gas flow is properly adjusted, one droplet will be formed for each wavelength of the varicose instability and accordingly the droplet formation rate will be approximately equal to the instability frequency and thus the frequency of the pressure pulses provided by the rotary shutter. As will be apparent to those skilled in the art in view of the present disclosure, very high instability frequencies and correspondingly high uniform droplet production rates may be achieved through the use of the present invention.

The properly adjusted coaxial gas velocity relative to the liquid jetstream velocity depends on the viscosity of the liquid feedstock and its surface tension. The liquid sol feedstocks employed in the present method have a viscosity of from about 10 to about 60 centistokes, and preferably from about 10 to about 25 centistokes. The surface tension of liquid feed stock solutions is generally determined by their major components, and ordinarily may only be lowered by additives. Fluid viscosity is quite responsive to small additions of thickening agents and may be adjusted to a preselected value with such materials.

As indicated hereinabove, it is an important feature of the present method that the coaxial stripping fluid be substantially inert with respect to solidification (gellation) of the liquid sol feedstock material. Gases such as air and nitrogen are generally suitable for this purpose. This feature contributes to the uniform formation of spherical particles and provides an inert zone with respect to gellation phenomena which encompasses a critical zone in which the liquid sol jetstream is undergoing droplet formation. The droplets (and inert gas) are subsequently directed into a zone where they are contacted with a gellation fluid or fluids suitable for solidification of the droplets under conditions consistent with preventing distortion of spherical droplet shape during gellation. The provision of such gellation fluids suitable for a particular liquid sol composition is within the skill of the art in view of the present disclosure.

The following examples illustrate various features of the method of the present invention employing an inert gas stripping agent.

EXAMPLE 1

A droplet generator similar to the embodiment illustrated in FIGS. 1, 2, 3 and 4 is provided which has a capillary tube about 3.6 cm. long with a 630 micron diameter orifice. The cylindrical passageway for the coaxial gas flow is about 1.1 cm. long and has a diameter of about 0.25 cm. The capillary tube extends about 0.6 cm. beyond the coaxial gas flow orifice of the packing nut. The liquid reservoir chamber has a volume of about 0.15 cm$^3$ and the membrane is about 0.013 cm. (5 mil) thick and is constructed from polyethylene sheet stock. The circular membrane has an exposed diameter of about 0.5 cm. The rotary disc has two notches uniformly spaced about its circumference accounting for about 50 percent of the notched area of the disc, and is driven by a high speed electric motor. The continuous gas jet nozzle is located about 1 cm. away from the membrane, has an orifice diameter of about 0.16 cm. and is supplied with air at a pressure of about 60 psig. A thorium oxide sol having a viscosity of 25.5 centistokes and a density of 1.18 grams per cubic centimeter is fed into the liquid reservoir chamber and thence through the capillary at a uniform flow rate of 13 milliliters per minute to form a laminar jetstream with an unperturbed diameter of about 630 microns. The notched disc is activated to provide a pressure pulse rate of 14,000 pulses per minute which results in an instability wavelength to jetstream diameter ratio of 4.75. The ideal droplet diameter calculated for those parameters is 1420 microns.

In order to demonstrate the effect of inert coaxial gas flow, three runs at these operating parameters are conducted with different coaxial flow rates of air supplied to the coaxial flow director. The droplets generated pass through a zone of gaseous ammonia where they are chemically gelled to a stable, shape retaining condition, and into an aqueous solution of ammonium hydroxide. The particles are then recovered for microscopic examination. Data for such runs are as follows:

| Run No. | Coaxial Air Rate (liters per minute) | Droplet Diameter Estimated By Microscopic Examination |
| --- | --- | --- |
| 1 | 0 | large and variable |
| 2 | 9.2 | about 1210 microns and larger |

-continued

| Run No. | Coaxial Air Rate (liters per minute) | Droplet Diameter Estimated By Microscopic Examination |
|---|---|---|
| 3 | 14.4 | about 1210 microns |

EXAMPLE 2

In this example, a run similar to those of Example 1 is carried out with the following parameters:

| | |
|---|---|
| Liquid feed stock | a thorium oxide sol |
| Liquid feed stock viscosity | 11.1 centistokes |
| Liquid feed stock density | 1.18 g/cm³ |
| Feed stock flow rate | 23.4 ml/min |
| Capillary orifice diameter | 814 microns |
| Instability frequency | 12,250/min |
| Wavelength/diameter ratio | 4.5 |
| Ideal droplet diameter | 1540 microns |

The coaxial air flow is adjusted for uniform breakup of the jetstream and the droplets are gelled by passage through an atmosphere of ammonia into an aqueous solution of ammonium hydroxide. The gelled particles are then air dried, and a sample of the air dried particles are photomicrographed and their diameters measured. Within this sample, 99% of the sphere diameters are within the relatively narrow range of 599 ± 43 microns.

EXAMPLE 3

A run is conducted similar to the run of Example 2 having the following parameters:

| | |
|---|---|
| Liquid feed stock | a thorium oxide sol |
| Liquid feed stock viscosity | 17.5 centistokes |
| Liquid feed stock density | 1.18 g/cm³ |
| Feed stock flow rate | 18 ml/min |
| Capillary orifice diameter | 630 microns |
| Instability frequency | 12,000/min |
| Wavelength/diameter ratio | 7.65 |
| Ideal droplet diameter | 1420 microns |

After gelling in ammonia and air drying, the particles are fired at a relatively low temperature and screened for size distribution:

| Size Distribution After Low Temperature Firing (microns) | |
|---|---|
| Screen Fraction | Weight Percent |
| 175–295 | 0.4 |
| 295–494 | 90.4 |
| (420–490 by optical method) | |
| over 495 | 9.3 |

In this example a higher wavelength/diameter ratio than that used in Examples 1 and 2 is employed to demonstrate the ability to produce droplets of various sizes through variation of this ratio.

EXAMPLE 4

In this example, a run similar to that of Example 2 is carried out to demonstrate the use of a more complex liquid sol feed stock. The run has the following parameters:

| | |
|---|---|
| Liquid feed stock | a dispersion of carbon in a solution containing zirconyl and uranyl nitrates |
| Liquid feed stock viscosity | 17.8 centistokes |
| Liquid feed stock density | 1.06 g/cm³ |
| Feed stock flow rate | 13.8 ml/min. |
| Capillary orifice diameter | 630 microns |
| Instability frequency | 15,800/min |
| Wavelength/diameter ratio | 4.5 |
| Ideal droplet diameter | 1150 microns |

The gelled droplets produced in this run are uniformly 1100 microns in diameter when used optically. The gelled droplets may be used in the production of carbide microspheres in accordance with known procedures.

EXAMPLE 5

In this example, runs are carried out similar to Example 2 (except that the two-notch disc is replaced with an eight-notch disc) at various droplet generating frequencies with the liquid feed rate varied to maintain the wavelength/diameter ratio at 4.5. The parameters of the runs are:

| | |
|---|---|
| Liquid feed stock | a uranyl nitrate solution |
| Liquid feed stock viscosity | 18 centistokes |
| Liquid feed stock density | 1.13 g/cm³ |
| Capillary orifice diameter | 342 microns |
| Wavelength/diameter | 4.5 |
| Ideal Droplet diameter | 646 microns |

| Run No. | Liquid Feed Flow Rate (ml/min) | Instability Frequency | Yield |
|---|---|---|---|
| 1 | 5.75 | 43,600 | High yield of ideal size |
| 2 | 12.7 | 88,000 | Good yield of ideal size some larger and smaller |
| 3 | 23 | 160,000 | Fair yield of ideal size many larger and smaller |

Accordingly, it is seen that a method has been provided which is capable of producing solidified particles of small diameter and very uniform size. The particles may be sintered in accordance with conventional procedures, and may readily be subjected to subsequent treatment such as the deposition of pyrolytic carbon coatings, in the provision of nuclear fuel particles.

Figure 6:
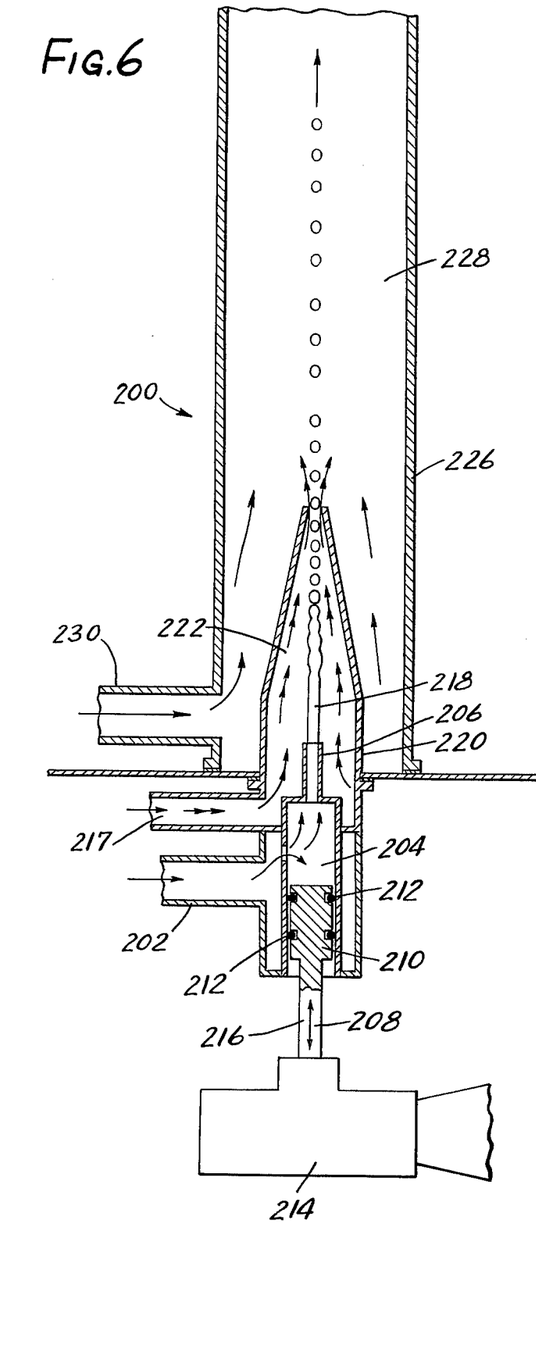
FIG. 6 is a cross-sectional side view of an embodiment of a droplet generating device in accordance with the present invention in which the coaxial stripping fluid is a liquid.

Illustrated in FIG. 6 is a particle generator 200 which is suitable for carrying out an embodiment of the present method in which an inert liquid is employed as the stripping fluid. In a manner similar to that of the particle generating device illustrated in FIGS. 1–5, the particle generator 200 is provided with a conduit 202 in fluid communication with a straight-sided reservoir zone 204 through which the liquid sol feed stock may be supplied under pressure to the reservoir zone. At the discharge end of the reservoir zone 204 and in fluid communication therewith is provided a capillary tube 206, and at the end of the reservoir opposite the capillary 206 is disposed a means 208 for transmitting regularly periodic pressure pulses to the liquid sol feed stock fluid in the reservoir 204. The pressure pulse transmitting means 208 in the embodiment of FIG. 6 comprises an axially movable piston 210 which makes a fluid tight seal with the reservoir zone 204 through the use of 0 rings 212, and which is in direct connection with a fixed electromechanical transducer 214, such as an electrodynamic shaker coil, via shaft 216. The transducer may be selected to be capable of driving the piston over the desired range of frequencies, and to thereby transmit regular, periodic pressure pulses to the liquid sol feed stock in the reservoir 204 which will provide regular, periodic varicose instabilities in a liquid sol jetstream 218 issuing from the orifice of the capillary 206.

Surrounding the capillary tube 206 is a radially symmetrical body 220 which defines a zone 222 surrounding the capillary tube 206, and which in the illustrated embodiment extends beyond the capillary orifice from which the liquid sol jetstream 218 is issued. In the generator 200 the body 220 has a lower cylindrical portion generally surrounding the capillary tube 206 and an open-ended, cone-shaped upper portion having a cross section which narrows with increasing distance from the end of the capillary tube. A conduit 217 provides fluid communication with the zone 222 in a manner designed to foster laminar flow in a direction longitudinally of the axis of the capillary tube 206. The inert stripping liquid is introduced through the conduit 217.

Surrounding the capillary and stripping zone assembly is a cylindrical body 226 which provides a gellation zone 228 for a liquid gellation agent for the liquid sol material of the jetstream. A conduit 230 located at the base of and in fluid communication with the cylindrical body 226 provides means for introducing a liquid gellation agent into the zone 228, which in the particle generator 200 is designed to provide an upward flow of the gellation agent in the zone 228.

Figure 7:
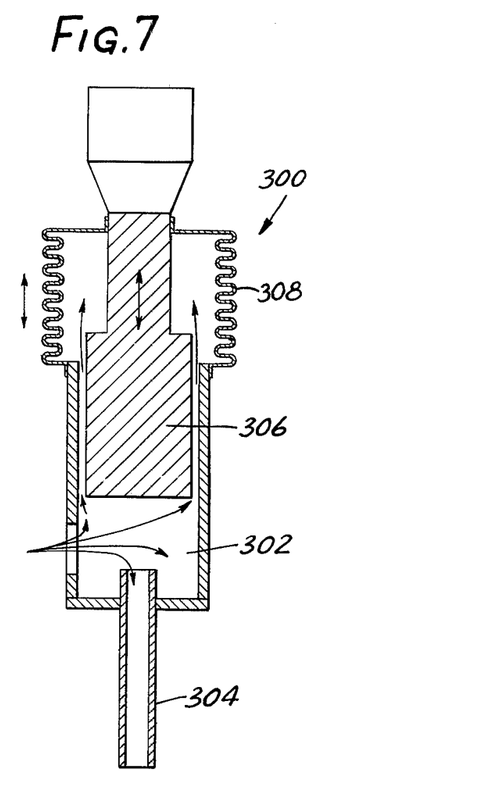
FIG. 7 is a cross-sectional view of another embodiment of a portion of the mechanism of the droplet generator of FIG. 6.

Illustrated in FIG. 7 is another mechanism 300 suitable for the transmission of regularly periodic pulsatile energy to the liquid sol in a reservoir zone 302 incident to its passage to the capillary 304. In the mechanism 300, the pressure pulses are transmitted by a loosely coupled piston 306 which is flexible mounted in a fluid tight manner with the reservoir 302 by means of a cylindrical, accordion-like coupling 308. The piston may be driven by a suitable mechanism (not shown) to function in the provision of varicose instabilities in the liquid sol jetstream.

In carrying out an embodiment of the method employing an inert liquid stripping agent by means of the particle generator 200, a regulated amount of a suitable liquid sol is introduced under pressure through conduit 202 into the reservoir 204 to provide a jetstream 218 of the sol issuing from the orifice of the capillary 206 in a manner similar to that described with respect to the embodiment of the method employing an inert gaseous stripping agent. The sol introduction is generally begun while maintaining a flow of inert liquid stripping agent and gellation agent through zones 222 and 228, respectively. The transducer 214 may then be activated to transmit regularly periodic pressure pulses to the liquid feedstock in the reservoir 204 at a frequency selected in combination with the jetstream flow rate to provide droplets of a desired, predetermined size and consistent with the jetstream wavelength considerations earlier referred to. Generally, the volumetric displacement of the reciprocating piston 210 will be controlled to be less than the volume of the desired droplet size, and as the flow resistance of the conduit 202 through which the liquid sol enters the reservoir 204 from the feedstock supply system (not shown) is substantially less than that of the capillary 206 from which the jetstream issues, a portion of this displacement is dissipated to the feedstock supply system.

The flow rate of the inert coaxial stripping fluid introduced into the zone 222 by means of conduit 217 may then be adjusted to provide the maximum enhancement of the uniform dispersion of the jetstream into uniform droplets. For the embodiment of the method employing an inert coaxial stripping liquid, the flow speed at the capillary should best be at least about ¼ of the linear exit speed of the jetstream. It has been found that the coaxial flow of inert stripping agent should be substantially laminar about the jetstream including the critical region in which breakup occurs, and in this connection, the coaxial flow of inert stripping liquid should be such that a Reynolds number of about 2500 is not exceeded. As a Reynolds number of about 2500 is exceeded, the coaxial stripping flow becomes non-laminar for the purposes of proper enhancement of the varicose instabilities and poor particle size distribution results.

The coaxial stripping fluid carries the dispersed droplets from the zone 222 into contact with the gelling fluid in the zone 228. In the illustrated particle generator 200, the inert coaxial stripping agent zone 222 is tapered at its upper end to provide for flow acceleration so that the formed droplets tend to be separated as they are conducted into the gelling zone 228.

As indicated hereinabove, the inert coaxial stripping fluid should be compatible, and preferably miscible, with the gelling agent, and the most appropriate selection of these materials is related to the type of liquid sol employed. The provision of suitable liquid gellation agents for a given liquid sol is within the skill of the sol-gel process art. Gellation liquids which function to chemically gel the droplets are preferred, although agents which function by exerting a dehydration or water extraction effect (or both dehydration and chemical gellation) on the droplets may also be employed. For actinide sols which are suitably chemically gelled by treatment with a basic gellation agent, hydrocarbon based liquids such as kerosine and including halogenated hydrocarbon liquids, which contain a dissolved base such as ammonia or other base which volatizes or decomposes upon particle sintering is particularly preferred.

As indicated, the inert stripping fluid should be compatible with the gelling agent, and, of course, should be non-gelling and substantially immiscible with respect to the liquid sol material. Preferably, the inert stripping fluid will be of substantially the same composition as the gelling agent liquid, with appropriate modification to render it inert with respect to solification of the liquid sol material. For example, when kerosene containing dissolved ammonia is employed as the gelling agent, kerosene without dissolved ammonia is suitably employed as the inert coaxial stripping agent.

At this point, it should be noted that compatibility of the stripping fluid with the gelling agent in the previously described method employing an inert gaseous stripping agent is provided by directing the stripping gas and jetstream droplets into a zone containing a gaseous gelling agent to provide for at least the initial part of the droplet gellation.

After gellation, the solidified particles may be sintered in accordance with conventional practice to provide solid oxide, carbide (if the sol contains dispersed carbonaceous material) or nitride particles of exceptional size uniformity.

The following examples illustrate a particle manufacturing method in which the inert coaxial stripping fluid is a liquid.

EXAMPLE 6

A particle generator similar to the embodiment illustrated in FIG. 6 is provided which has a capillary tube about 3.5 cm. long with an orifice diameter of about 584 microns (about 840 microns outside diameter), and a cylinder-cone assembly with a cylindrical portion about one inch long with an inside diameter of about 0.243 inches, and a conical portion about 3½ inches long tapering to an inside diameter of about 0.19 inches at its upper end. This assembly is located at the base of a gellation tube about 12 feet long with an inside diameter of about ¾ inch.

A thoria sol having a density of about 1.845 grams per cc. and containing about 930 grams of $ThO_2$ per liter and a viscosity of about 15 centistokes is fed into the generator at a flow rate of about 25 grams of sol per minute. The transducer is activated with a frequency of about 320 Hertz with a sine waveform power source to provide a piston displacement of about ⅛ the volume of the predetermined droplet size. The coaxial velocity of an ammonia-free kerosene stripping liquid is provided at a rate of about 1 liter per minute, and the flow rate in the 12 foot tube of a kerosene gelling liquid containing dissolved ammonia is adjusted so that the droplets emerging from the end of the cone with the inert stripping liquid are carried to the top of the tube in about 30 seconds, and results in a rate of about 6 liters of kerosene per minute. The entire apparatus is constructed of transparent material and the initial breakup of the jetstream can be seen (with strobelight illumination) to be occuring in the cylindrical portion of the cylindrical-conical body 220. The gelled particles are collected and sintered to provide a product yield of about 98.50 weight percent of the particles having a diameter between 450–550 microns as determined by screening measurement. The particles are spherical and have an actual size dispersion of about plus or minus 8%. The production rate for this example is about 756 grams of $ThO_2$ per minute.

EXAMPLE 7

A run is carried out in a manner similar to that of Example 6 except that a flow rate of the thoria sol of about 17 grams per minute, representing a production rate of about 590 grams of $ThO_2$ per hour, was employed with an inert coaxial kerosene fluid flow of about 0.56 liters per minute, a transducer frequency of about 218 Hertz and a piston volume displacement of about one-ninth of the ideal droplet volume. The solidified spheres are collected and sintered to provide a product with a yield of about 97.65 weight percent of spherical thoria particles having diameters of 450–550 microns as determined by screening, with an actual diametric dispersion of about plus or minus 6%.

Accordingly, it is seen that improved sol-gel methods have been provided which are particularly adapted to the reliable and economical manufacture of microspherical nuclear fuel particles of highly uniform size and excellent quality. As will be apparent to those skilled in the art, various modifications, adaptations and variations of the foregoing specific disclosure can be made without departing from the teachings of the present invention.

Various features of the invention are set forth in the following claims.

What is claimed is:

1. In a sol-gel process for the manufacture of solid microspheres of inorganic oxides, carbides or nitrides in which a liquid sol of the inorganic material is dispersed into droplets, the droplets are solidified to a form-stable condition by contact with a gelling fluid for the sol and the gelled, solidified droplets are subsequently sintered to provide solid microspherical particles, the improvement comprising carrying out in combination the steps of providing a jetstream of a liquid sol feedstock having a viscosity of from about 10 to about 60 centistokes, inducing uniformly periodic varicose instabilities in the jetstream having a wavelength of at least about pi times the unperturbed diameter of the jetstream, providing a concurrent, coaxial stripping flow of a first fluid surrounding the jetstream to enhance the varicose instabilities in order to cause the uniform dispersion of the jetstream into uniform spherical droplets, said first fluid being substantially inert with respect to causing the solidification of said sol, and subsequently contacting said droplets with a gelling fluid compatible with said first fluid and which is interactive with the sol to solidify the droplets.

2. A method in accordance with claim 1 wherein said inert coaxial stripping fluid is a gas and wherein the velocity of said coaxial gas flow along said jetstream is from about one to about eight times the velocity of said jetstream at the point of formation of said jetstream.

3. A method in accordance with claim 2 wherein said second gelling fluid comprises ammonia gas.

4. A method in accordance with claim 1 wherein said inert coaxial stripping fluid is a liquid, wherein said gelling fluid is a liquid compatible with said liquid stripping fluid, and wherein the flow of said inert coaxial stripping fluid is laminar around said jetstream.

5. A method in accordance with claim 1 wherein said sol is an actinide element sol, and wherein said solid microspheres are fertile or fissionable nuclear fuel particles.

* * * * *